(12) United States Patent
Park et al.

(10) Patent No.: US 6,414,923 B1
(45) Date of Patent: Jul. 2, 2002

(54) RECORDING/REPRODUCING METHOD OF OPTICAL RECORDING MEDIUM

(75) Inventors: Yong-Cheol Park; Kyu Hwa Jeong; Jong In Shin, all of Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/374,986

(22) Filed: Aug. 16, 1999

(30) Foreign Application Priority Data

Aug. 17, 1998 (KR) .............................. 98-33311

(51) Int. Cl.⁷ ................................................ G11B 7/00
(52) U.S. Cl. .............................. 369/53.15; 369/53.17; 369/47.14
(58) Field of Search ............................ 369/47.1, 47.14, 369/47.15, 53.1, 53.11, 53.15, 53.16, 53.17, 53.2, 53.45, 59.1, 275.1, 275.3

(56) References Cited

U.S. PATENT DOCUMENTS 6,292,445 B1 * 9/2001 Ito et al. .................. 369/47.14

* cited by examiner

Primary Examiner—Muhammad Edun
(74) Attorney, Agent, or Firm—Birch, Stewart, Kolasch & Birch, LLP

(57) ABSTRACT

Method for recording/reproducing a data to/from a rewritable optical recording medium, including the steps of (1) conducting data writing/reading to/from a defective block if the defective block is encountered during a realtime writing/reading, and (2) conducting data writing/reading to/from a replacement block of the defective block if the defective block is encountered during a non-realtime writing/reading, whereby simplifying interface between the host and the optical disk recording/reproducing device, particularly in realtime writing/reproducing, that permits to reduce a burden on the host.

20 Claims, 11 Drawing Sheets

| b63 | b62......b56 | b55 ......b32 | b31......b24 | b23 ......b0 |
|---|---|---|---|---|
| FRM | reserved | Sector number of a first sector in a defective block | reserved | Sector number of a first sector in a replacement block |

⊠ : defective block listed on SDL

▨ : defective block not listed on SDL
(PID error block)

FIG.7A
Related Art

| header field | mirror field | gap field | guard 1 field | VFO3 field | PS field | data field | PA3 field | guard 2 field | buffer field |
|---|---|---|---|---|---|---|---|---|---|
| | | \multicolumn{8}{c}{recording field} | | |
| 128 | 2 | 10+J/16 | 20+K | 35 | 3 | 2418 | 1 | 55−K | 25−J/16 |

| header 1 field | | | | | | header 2 field | | | | | | header 3 field | | | | | | header 4 field | | | | |
|---|---|---|---|---|---|---|---|---|---|---|---|---|---|---|---|---|---|---|---|---|---|---|
| VFO1 | AM | PID1 | IED1 | PA1 | VFO2 | AM | PID2 | IED2 | PA2 | VFO1 | AM | PID3 | IED3 | PA1 | VFO2 | AM | PID4 | IED4 | PA2 |
| 36 | 3 | 4 | 2 | 1 | 8 | 3 | 4 | 2 | 1 | 36 | 3 | 4 | 2 | 1 | 8 | 3 | 4 | 2 | 1 |

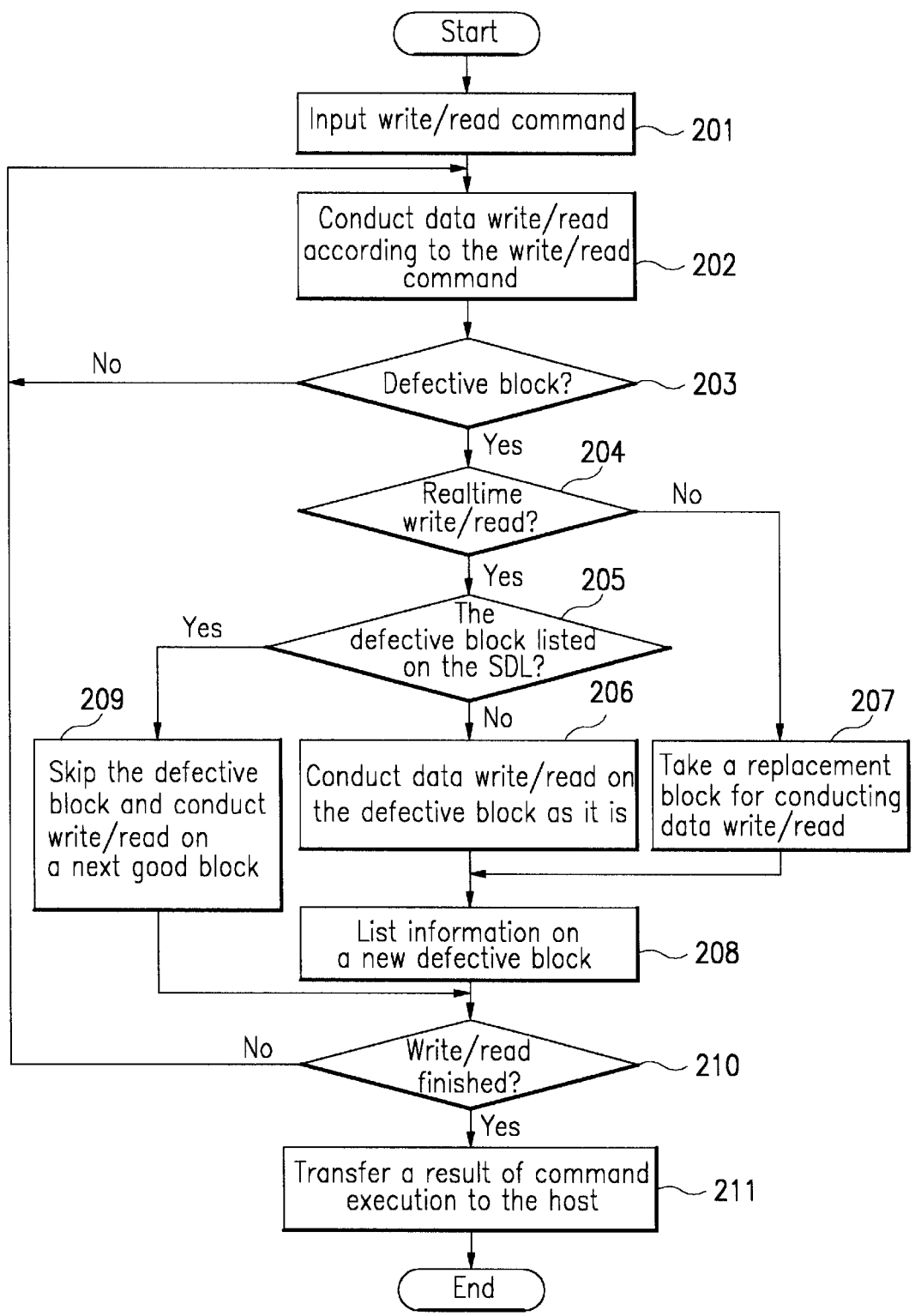

| 1, sblkG, 0 |
|---|

RECORDING/REPRODUCING METHOD OF OPTICAL RECORDING MEDIUM

BACKGROUND OF THE INVENTION

1. Field of the Invention

The present invention relates to an optical recording medium, and more particularly, to a recording/reproducing method of a rewritable optical recording medium.

2. Background of the Invention

In general, there are rewritable compact disc, and rewritable digital versatile disc (DVD-RW, DVD-RAM, DVD+RW) in optical recording mediums, particularly, in optical disks, which are rewritable freely and repetitively. In those rewritable optical disks, information writing /reading thereto/therefrom are made repetitively. As the nature of use of the optical disk is, the repetitive write/read of information causes a change of a mixing ratio of a recording layer mixture provided for recording the information from an initial mixing ratio, which leads to a loss of initial properties of the mixture that causes an error in writing/reading information, which is called degradation. Areas of the degradation are turned up as defective areas when formatting, or write or read command for the optical disk is carried out. Other than the degradation, defective areas on the rewritable optical disk are caused by scratches on a surface, dusts, and/or from production defects. Therefore, in order to prevent writing/reading data to/from the defective areas formed by the foregoing causes, management of the defective areas is required. To do this, as shown in FIG. 1, DMAs (Defect Management Areas) are provided in lead-in areas and in lead-out areas of the optical recording medium for managing the defective areas on the optical recording medium. And, data areas are managed in zones (or groups), each having a user area for use in actual writing of data and a spare area for use in a case of defect occurrence in the user area.

In general, there are four DMAs provided in one disk (for example, a DVD-RAM), two in the lead-in area and the other two in the lead-out area. As management of the DMAs is important, the same data is repeatedly written in the four DMAs for protection of data. Each DMA has two blocks having 32 sectors in total, i.e., one block has 16 sectors. A first block of each DMA (called as DDS/PDL block) includes a DDS (Disk Definition Structure) and a PDL (Primary Defect List), and a second block (called as SDL block) of each DMA includes an SDL (Secondary Defect List). The PDL is a primary defective data storage portion and the SDL is a secondary defective data storage portion. In general, the PDL is a storage of entries of all defective sectors identified in formatting, i.e., initializing and re-initializing, of the disk. Each entry has an entry type and a sector number corresponding to a defective sector. On the other hand, the SDL, listed in block units, is a storage of entries of defective areas occurred after the formatting, or defective areas which can not be stored in the PDL during the formatting.

As shown in FIG. 2, each SDL entry has an area in storage of a sector number of a first sector in a block having a defective sector occurred therein and the other area in storage of a sector number of a first sector in a spare block which will replace the defective block. And, one bit is assigned to each entry for FRM (Forced Reassignment Marking); if the one bit is 0b, it indicates that a spare block is assigned and the spare block has no defects, but if the bit is 1b, it indicates that no spare block is assigned, or an assigned spare block is defective. The defective areas (i.e., defective sectors or defective blocks) in the data area are replaced with good areas, according to a slipping replacement algorithm or linear replacement algorithm.

Referring to FIG. 3A, in the slipping replacement which is applicable to a case when a defective area is listed on the PDL, if the defective sector listed on the PDL is present in the user area on which an actual data is to be written, the defective sector is skipped, and instead, the defective sector is replaced with a good sector next to the defective sector in writing a data. Consequently, the user area on which the data is being written is pushed backward, to occupy the spare area as much as the skipped defective sector, at the end. That is, the spare area is assigned to the user area as much as the skipped defective sectors. For example, if there are two defective sectors listed on the PDL, the data is written pushed back by two sectors into the spare area.

And, referring to FIG. 3B, in the linear replacement which is applicable to a case when a defective area is listed on the SDL, if there is a defective block listed on the SDL, the defective block is replaced with block units of replacement areas assigned to the spare area in writing the data. Though a PSN (Physical Sector Number) assigned to the defective block is not changed, an LSN (Logical Sector Number) is transferred to the replacement block, together with the data. This linear replacement is effective in non-realtime writing/reading a data.

FIG. 4 illustrates a block diagram showing one example of a recording portion in a related art optical recording/reproduction device provided with an optical pickup for writing/reading a data to/from an optical recording medium, a pickup mover for moving the optical pickup, a data processor for processing and providing an input data to the optical pickup or processing a data read or received from the optical disk through the optical pickup, an interface, and a microcomputer for controlling the above units. A host is connected to the interface of the device for recording/reproducing a data to/from an optical recording medium for exchange of command and data.

Referring to FIG. 4, when a data to be written is provided to the host, the host provides a write command to the device for recording/reproducing a data to/from an optical recording medium, together with the data to be written. Upon reception of the data to be written on the optical recording medium, the recording/reproducing device writes the data starting from a position designated by the write command. In this instance, the recording/reproducing device writes no data on defective areas utilizing the PDL and the SDL which indicate defects on the optical recording medium. That is, physical sectors listed on the PDL are skipped in the writing, and, as shown in FIG. 5A, physical blocks sb1kA and sb1kB listed on the SDL are replaced with replacement blocks sb1kD and sb1kF assigned to the spare area in the writing. In this instance, as shown in FIG. 5B, (0, sb1kA, sb1kF) and (0, sb1kb, sb1kD) are left on the SDL entry. The (0, sb1kA, sb1kF) indicates that a spare block without defects is assigned and a data to be written on a defective block sb1kA in a user area is written on a replacement block sb1kF in a spare area. And, in the writing or reading, if a defective block not listed on the SDL, or a block with a high possibility of error occurrence is present, the block is taken as a defective block, a replacement block is located in the spare area, data of the defective block is written again in the replacement block, and a first sector number of the defective block and a first sector number of the replacement block are listed in association with each other on the SDL entry.

In this instance, in order to write data while replacing the defective block listed on the SDL with a replacement block assigned to the spare area, the optical pickup must be shifted to the spare area and returned back to the user area again. However, a time period required for the shifting and returning back is a great obstacle for realtime writing. Accordingly, different methods for managing a defective area applicable to the case when a realtime writing is required, such as A/V (for example, movies), are suggested. One of the methods is the skipping method in which no linear replacement is employed in using the SDL, but a data is written on a good block next to an encountered defective block as shown in FIG. 6. In the skipping method, not only the defective block listed on the SDL, but also a new defective block not listed on the SDL (a hatched block in FIG. 6) are skipped. By doing so, the obstacle in a realtime writing can be eliminated because the optical pickup is not required to shift to the spare area every time the optical pickup encounters a defective block. This reduces a shifting time of the optical pickup.

However, the skipping method may cause some problems in the realtime writing and reading. That is, data writing is, in general, proceeded in block units each having 16 sectors, a block unit of ECC (Error Correction Code). As shown in FIG. 7A, each sector has a header field, a mirror field, and a recording field, and, as shown in FIG. 7B, the header field in turn has four header fields (header 1 field~header 4 field). And, as shown in FIG. 7C, each header field in FIG. 7B has an area representing sector information and an area representing a sector number, and the sector information area in turn has areas of a PID (Physical Identification) representing a sector address, a sector type and a layer number. That is, one sector has four PIDs in total. In this instance, if there are PID errors more than a preset number assigned for one sector, such as 3, the sector is taken as a defective sector. If there is one or more than one defective sectors each having such PID errors in one ECC block, the block is taken as a defective block.

As shown in FIG. 7A, the recording field includes a data field for recording data which are called data unit 1, data unit 2 and data unit 3 according to signal processing steps. The data unit 1 is a data processed until an ECC encoding, the data unit 2 is a data ECC encoded, and the data unit 3 is a data modulated from the data unit 2 for actual writing. If a defective block listed on an SDL or a sector having a PID error is encountered during writing a realtime data, the block containing the sector is taken as a defective block and is skipped to a next good block, when LSN should be increased as many as a number of the skipped blocks for subjecting the data to be written to an ECC encoding again using the increased LSN. And, as the host writes the data not at a designated position, but at a new position, the host should identify information on the defective block and change file information. To do this, the optical disk recording/reproducing device should transfer the information on the defective blocks to the host, and the host should update the present record of information (for example, file system, and the like) according to the information on the defective block.

And, the optical disk recording/reproducing device should finish the ECC encoding and modulation before the pickup reaches the next good block, which fails in some cases. That is, although the pickup exists on a good block, the pickup can not write data on the good block if ECC encoding and modulation of the data to be written are not finished, yet. Therefore, in order to write data on the good block, the pickup should jump back one track after the disk makes one further turn, which time period can be an obstacle for a realtime writing. And, the addition of a control circuit for conducting the ECC encoding and modulation of transferred data again in skipping the defective block for writing the data on the good block requires a complicated hardware. The return of the error information from the optical disk recording/reproducing device to the host required for skipping the defective block because no data can be written/read to/from the defective block, makes an interface between the optical disk recording/reproducing device and the host complicated and gives a burden to the host. That is, since the optical disk recording/reproducing device should communicate the skipped defective block information to the host and the host should update an existing information (for example, file information, and the like) according to the information on defects, the interface is complicated and burden on the host is increased in the related art.

SUMMARY OF THE INVENTION

Accordingly, the present invention is directed to a recording/reproducing method of an optical recording medium that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for recording/reproducing a data to/from a rewritable optical recording medium, includes the steps of (1) conducting data writing/reading to/from a defective block if the defective block is encountered during a realtime writing/reading, and (2) conducting data writing/reading to/from a replacement block of the defective block if the defective block is encountered during a non-realtime writing/reading.

The above method further includes the step of storing positional information of the defective block if the defective block is a new defective block.

The positional information of the defective block is preferably stored in an SDL (secondary defect list).

If the defective block is encountered during the realtime writing/reading, only the positional information of the defective block is stored in the SDL, including information that no replacement operation is made.

If the defective block is encountered during the non-realtime writing/reading, positional information both of the defective block and the replacement block is stored in the SDL, including information that replacement operation is made.

In the realtime writing/reading, data reading is started from the defective block in reading after completion of writing.

In other aspect of the present invention, there is provided a method for recording/reproducing a data to/from an optical recording medium in realtime, including the steps of (1) conducting a data writing/reading to/from a defective block as it is if the defective block is encountered during data writing/reading, and (2) storing positional information of the defective block if the defective block is a new defective block.

In another aspect of the present invention, there is provided a method for recording/reproducing a data to/from an optical recording medium in realtime, including the steps of (1) determining whether a defective block is one listed on the SDL if the defective block is encountered during data writing/reading, (2) continuing the data writing/reading on the defective block as it is if it is determined in the step (1) that the defective block is one not listed on the SDL, and (3) storing positional information of the defective block on the SDL.

Data reading is started from the defective block in reading the data after completion of writing by repeating the above steps.

Data is written on a good block next to the defective block without writing the data on the defective block in data rewriting, after completion of writing by repeating the above steps.

If it is determined in the above step that the defective block is listed on the SDL, the defective block is skipped and the data writing/reading is conducted on a good block next to the defective block.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 7A illustrates a related art sector architecture;

FIG. 7B illustrates a related art header field architecture shown in FIG. 7A;

FIG. 10 illustrates a flow chart of an optical recording medium recording/reproducing method in accordance with a second preferred embodiment of the present invention;

DETAILED DESCRIPTION OF THE PREFERRED EMBODIMENTS

Reference will now be made in detail to the preferred embodiments of the present invention, examples of which are illustrated in the accompanying drawings. A method for dealing with a defective block when one is encountered during data writing/reading to/from a rewritable optical recording medium of the present invention will be explained by way of two embodiments. That is, a first embodiment is effective when a host gives write/read command under a state the host does not know the defective block, and the second embodiment is effective when the host gives a write/read command under a state the host knows the defective block information.

First Embodiment

Figure 8:
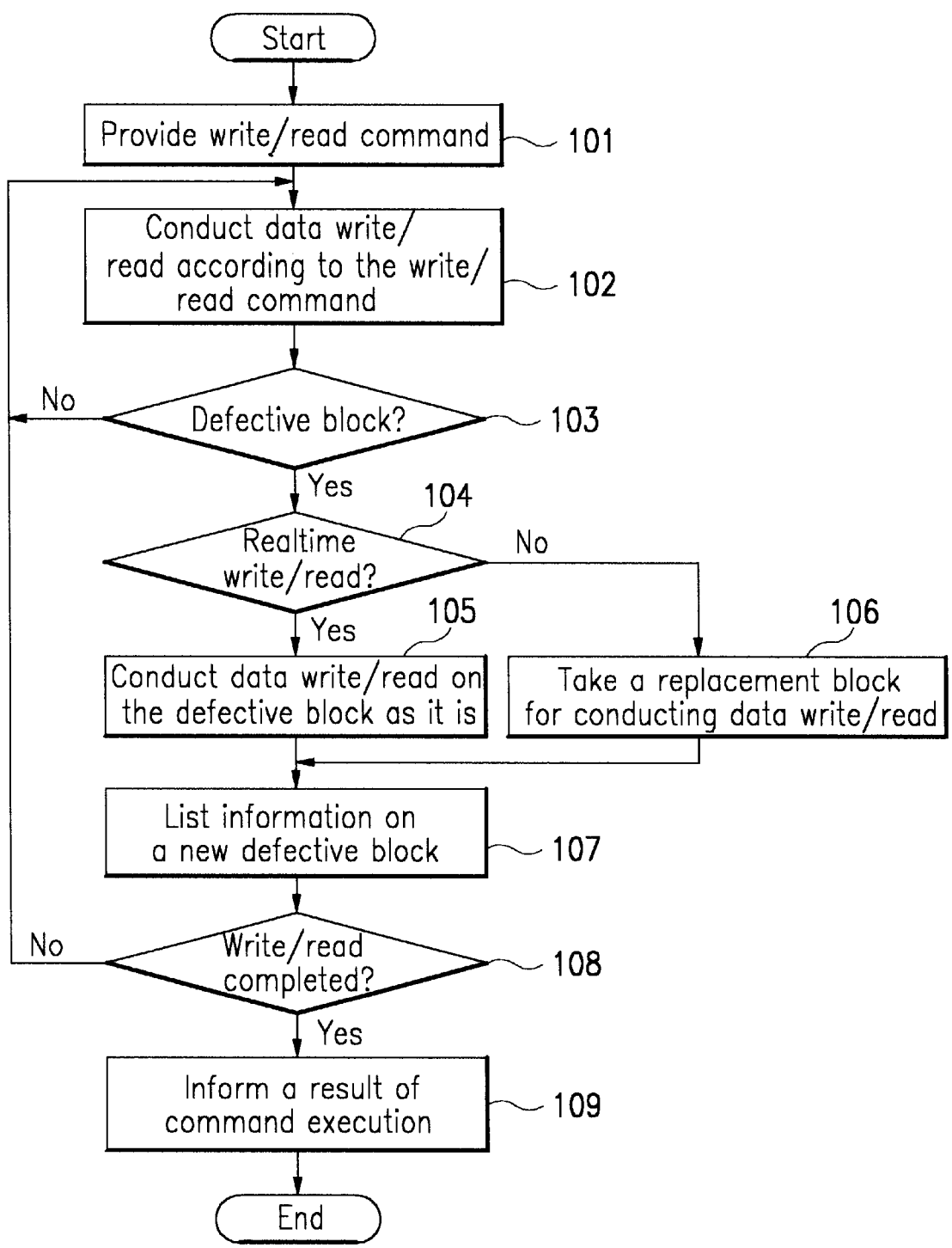
FIG. 8 illustrates a flow chart of an optical recording medium recording/reproducing method in accordance with a first preferred embodiment of the present invention.

The first embodiment suggests writing or reading a data to/from the defective block as it is if it is a realtime writing/reading when the defective block is encountered, and writing or reading the data to/from a replacement block after finding one if it is a non-realtime writing/reading when the defective block is encountered. FIG. 8 illustrates a flow chart of an optical recording medium recording/reproducing method in accordance with a first preferred embodiment of the present invention.

Figures 9A, 9B:
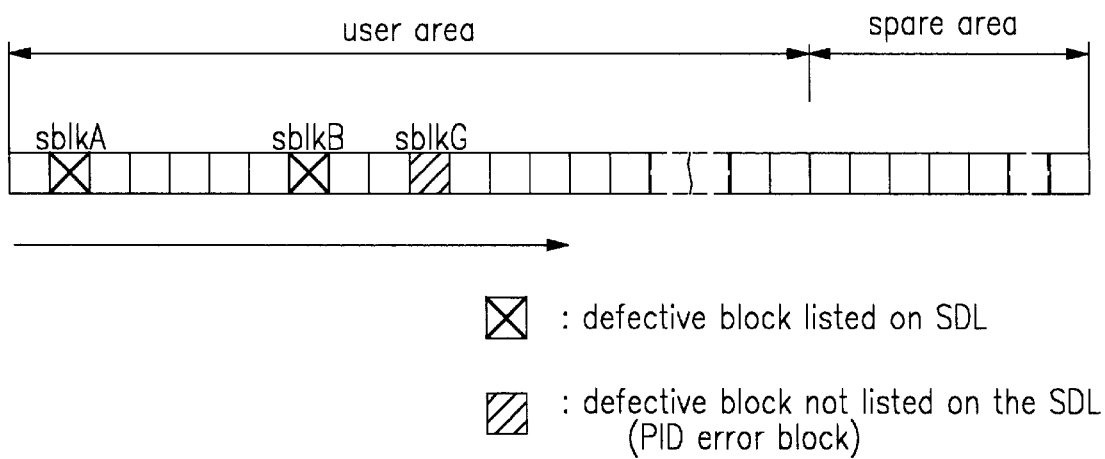
FIG. 9A illustrates writing a data on a defective block as it is according to the first embodiment optical recording medium recording/reproducing method.
FIG. 9B illustrates an example of SDL entry having a new defective block shown in FIG. 9A listed thereon according to the present invention.

Referring to FIG. 8, the method starts from the host transferring a data to be written to the optical disk recording/reproducing device, when it is writing, together with a write or read command if writing or reading is required (step 101). Accordingly, the optical disk recording/reproducing device checks if there is a defective block (step 103) during conducting data writing/reading according to the write/read command (step 102). The defective block may be one listed on an SDL or a new one. The new defective block has in general PID errors. In the step 103, if no defective block is found, writing/reading is continued, and, if a defective block is found, it is determined whether the present data writing/reading is a realtime writing/reading (step 104). Since the write/read command contains information on whether or not the data writing/reading is conducted in realtime, step 104 can be performed based on the write/read command. If it is determined that it is a realtime writing/reading in the step 104, the data is written on the defective block as it is as shown in FIG. 9A if a writing operation is involved, and the data is read out of the defective block if a reading operation is involved (step 105). In this instance, even if there is a defective block, as the data is written to or read out of the defective block, the result is that the optical disk recording/reproducing device conducts the write/read command of the host as it is. That is, the block is taken as a good block even if it is a defective block. Therefore, the optical disk recording/reproducing device is not required to transfer the information on the defective block to the host. The defective block may or may not be a defective block listed on the SDL or may be a new defective block.

The present method has a probability of data loss because the data is written/read to/from the defective block as it is.

However, since the realtime writing/reading is done for an A/V data, a slight loss of the data matters not so much because the loss is negligible to a human vision. And, as no skip is required, the hardware becomes simple because no additional circuit for the skipping is required. And, since the transfer of the error information to the host is not required whenever a defective block is encountered, the interface is simple, with a reduction of burden to the host.

After writing or reading of the data to/from the defective block, even if transfer of the information on the defective block to the host is not required, information of the new defective block is listed on the SDL entry (step 107) during an appropriate time period. This time period would not affect the realtime writing/reading and can be, for example, a time period when the write/read command ends and no next write/read command is received, so as to provide information that a data with a defect is written, to make a linear replacement in non-realtime writing/reading without a subsequent formatting. In this instance, only positional information of the defective block is written, with an indication on the SDL entry that no replacement operation of the defective block is made, using the FRM bit or any other identification information. If the FRM bit is used, the SDL entry formed in this case may be (1, sb1kG, 0), which indicates that, even though there is a defect occurred at a block sb1kG, the defective block is not replaced.

In the meantime, if it is determined in the step 104 that a non-realtime writing/reading is involved, a replacement block is taken to conduct the writing/reading (step 106). That is, if the defective block is listed on the SDL, the data is written/read to/from a replacement block of the defective block. If the defective block is a new defective block, the data is written/read to/from a replacement block taken from the spare area. And, the new defective block is listed on the SDL (step 107), when information on the defective block and on a replacement block for the defective block, and information indicating that a linear replacement is made and the replacement block has no defect are listed on the SDL entry. The data writing/reading is conducted as the aforementioned process until completion of the data writing/reading (step 108) when a result of the command execution is transferred to the host (step 109). If it is a realtime writing/reading, there is no information on the defective block in a report transferred to the host, because the data is written/read taking all the defective blocks listed on the SDL or the defective blocks found newly as good blocks. For example, if the host gives a command that 50 data are to be written or read, the optical disk recording/reproduction device either writes or reads 50 data regardless of defective blocks and transfers them to the host.

Thus, the first embodiment recording/reproducing method of an optical recording medium of the present invention is not limited by time in making a realtime writing/reading because the writing/reading is made as it is even if a defective block is encountered, and makes interface simple because transfer of additional information to the host is not required whenever skipping is made, which eliminates the requirement for a frequent interface between the host and the optical disk recording/reproducing device. And, a burden on the host is reduced because change of file information caused by the defect information is not required. At the same time, hardware is simplified as the drive requires no additional control circuit for the skipping (for example, the ECC encoding and the modulation circuit).

Second Embodiment

The second embodiment recording/reproducing method of an optical recording medium according to the present invention suggests conduction of writing/reading while skipping a defective block listed on an SDL and not skipping a defective block not listed on the SDL. Since information on the defective block listed on the SDL may be known to the host in advance, this second embodiment method may preferably be applied to the optical disk recording/reproducing device together with a write/read command when the host provides the same to the optical disk recording/reproducing device, taking it into account that the optical disk recording/reproducing device will skip the defective block. This may be done by providing a protocol that the optical disk recording/reproducing device is to skip the defective block if the defective block which falls within a scope of the write/read command the host provided is listed on the SDL already.

FIG. 10 illustrates a flow chart of an optical recording medium recording/reproducing method in accordance with a second preferred embodiment of the present invention.

Referring to FIG. 10, alike the first embodiment, if write/read is required, a host provides a data to be written to the optical disk recording/reproducing device, in a case of writing, together with a write/read command (step 201). Subsequently, the optical disk recording/reproducing device checks presence of a defective block (step 203) while conducting the data writing/reading according to the write/read command (step 202). The defective block may be one listed on the SDL or may be found as a new defective block. If no defective block is found in the step 203, the write/read is continued, and if any defective block is found, it is determined whether the present data write/read is a realtime write/read (step 204). This can be known from the write/read command.

Figures 1, 2:
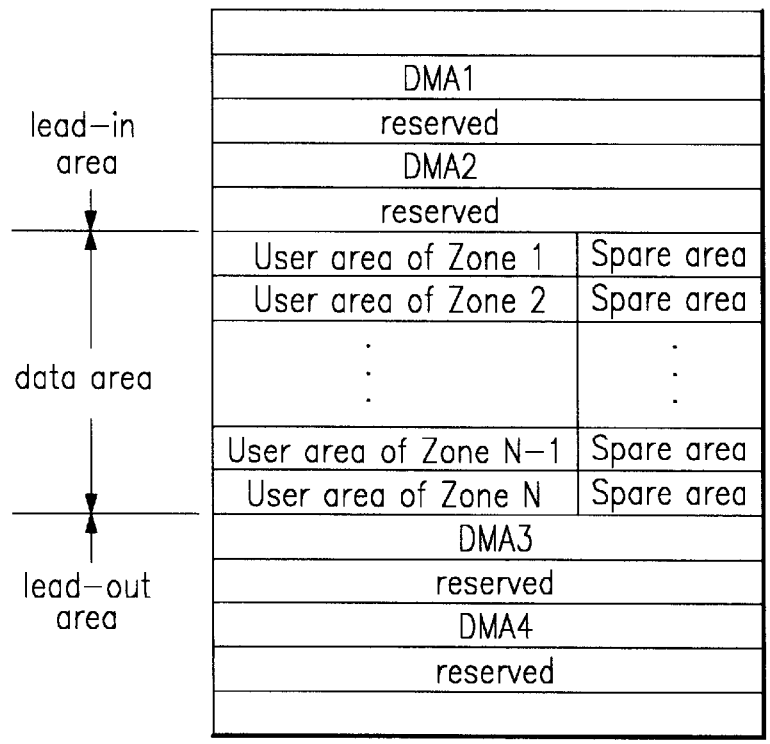
FIG. 1 illustrates a related art data area architecture of an optical disk.
FIG. 2 illustrates a related art SDL entry architecture.
Figure 3A:
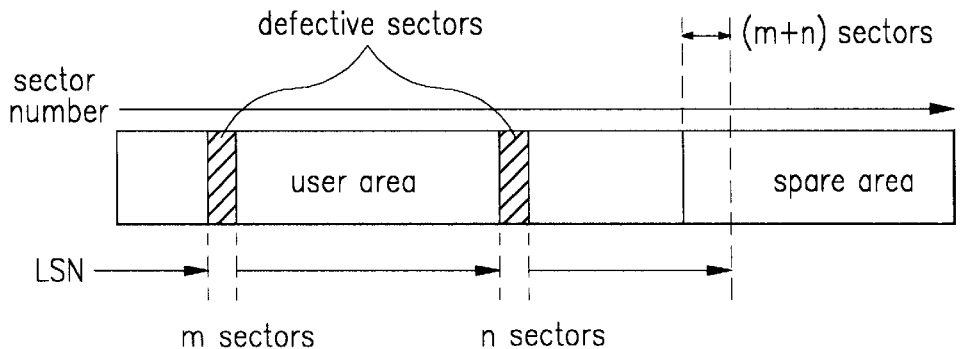
FIG. 3A illustrates a related art slipping replacement method.
Figure 3B:
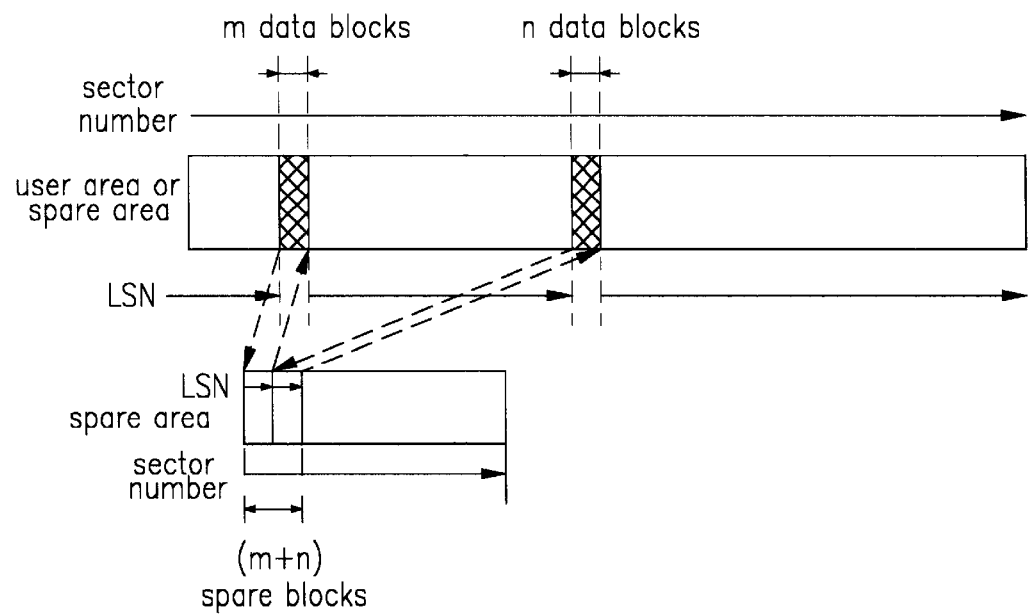
FIG. 3B illustrates a related art linear replacement method.
Figure 4:
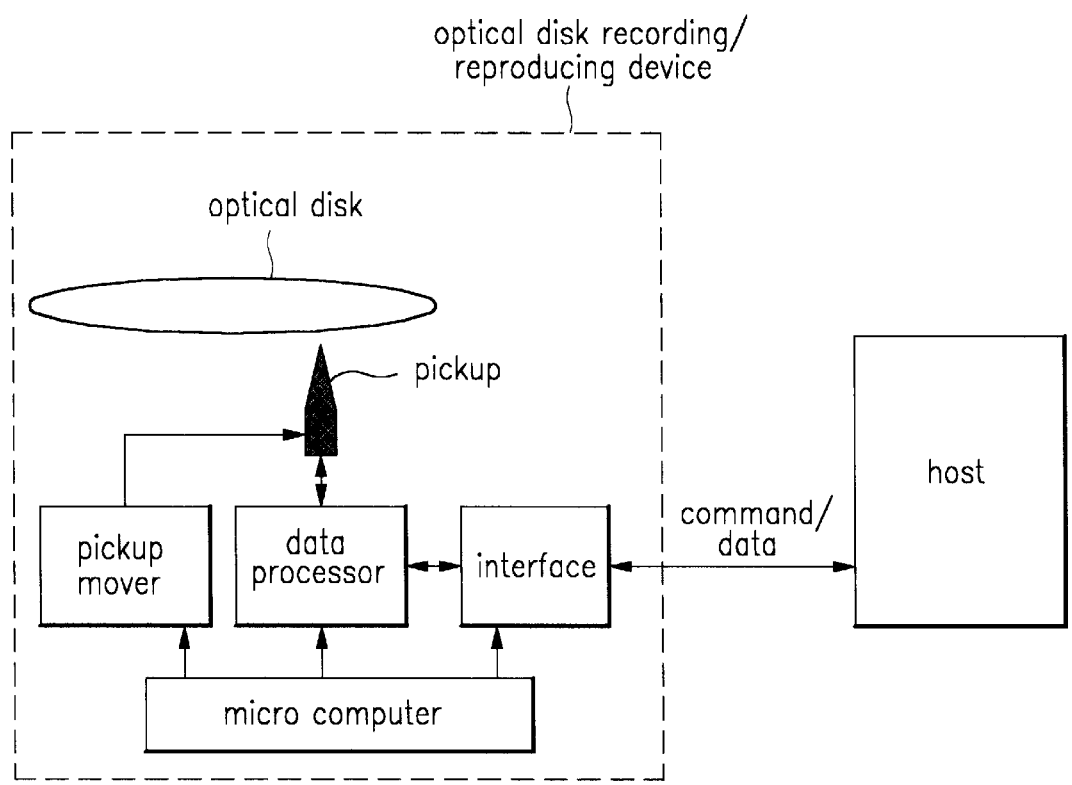
FIG. 4 illustrates a block diagram of a related art optical disk recording device.
Figure 5A:
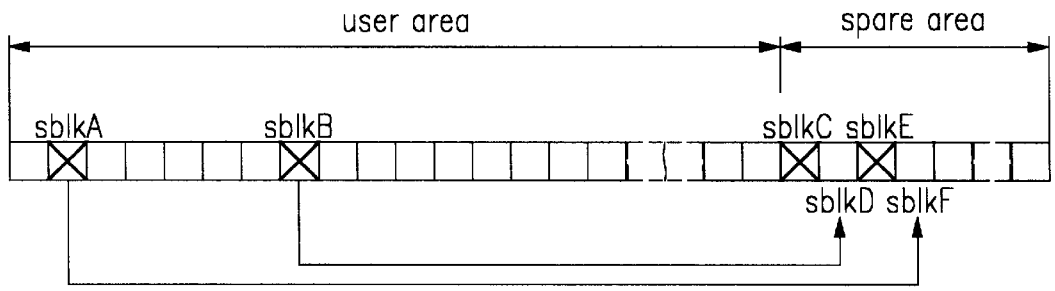
FIG. 5A illustrates writing data by a related art linear replacement method on the disk shown in FIG. 4 using SDL.
Figure 5B:
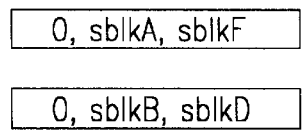
FIG. 5B illustrates one example of information left in the SDL entry shown in FIG. 5A.
Figure 6:
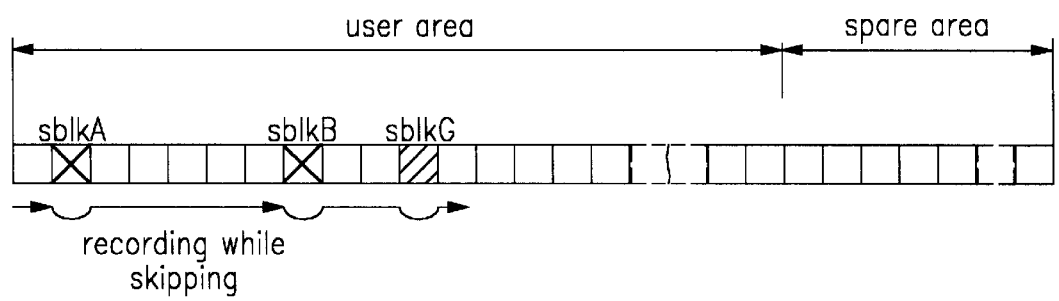
FIG. 6 illustrates writing data according to a related art by skipping defective block on the disk shown in FIG. 4.
Figure 7C:
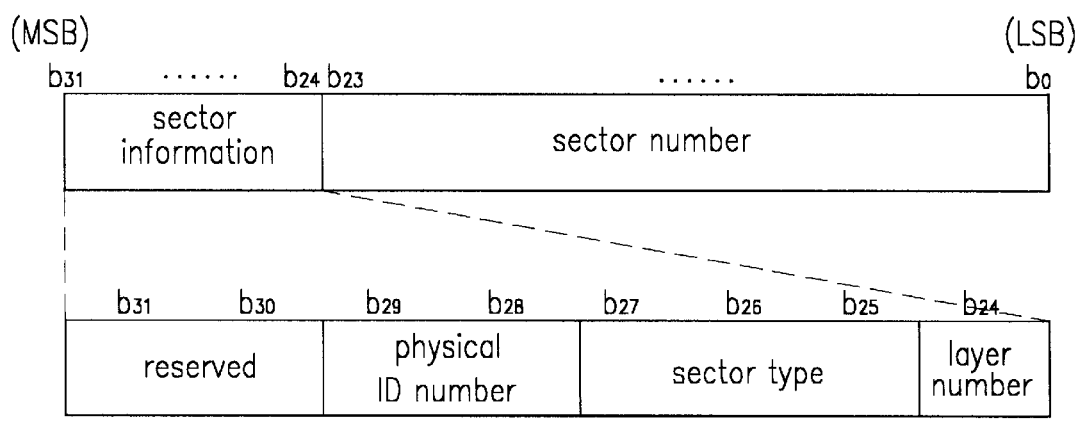
FIG. 7C illustrates one of the header field architectures shown in FIG. 7B.
Figures 11A, 11B:
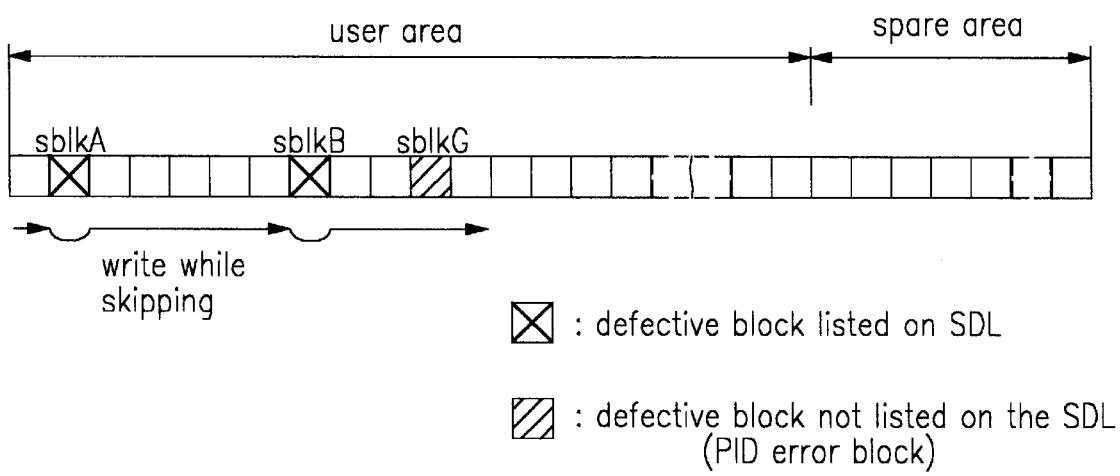
FIG. 11A illustrates skipping a defective block listed on the SDL and writing a data on a new defective block not listed on the SLD as it is according to the second embodiment optical recording medium recording/reproducing method; and, FIG. 11B illustrates an example of an SDL entry having a new defective block shown in FIG. 11A listed thereon according to the present invention.

If it is determined that the present data write/read is a realtime one, it is determined whether the newly found defective block is a defective block listed on the SDL (step 205). If it is determined that the defective block is a defective block listed on the SDL in the step 205, the defective block is skipped as shown in FIG. 11A, and the data write/read is continued on the next good block (step 209). In this instance, if the host already has the write/read command given with the information on the defective block known in advance, the optical disk recording/reproducing device is not required to return the error information to the host. And, if it is determined that the defective block is one not listed on the SDL in the step 205, as shown in FIG. 11A, the defect is disregarded, and the data write/read is conducted on the defective block as it is (step 206). While writing the data according to the aforementioned process, information on the new defective block is listed on an SDL entry at an appropriate time period, i.e., a time period that does not influence the realtime writing, for example, a time period when the write command is finished but the next write command is not received yet (step 208). The information is used to prevent any more writing of data on the defective block in the next writing. In this instance too, only information on the defective block is listed, with an indication on the SDL entry that no replacement operation is made for the defective block, using, for example, the FRM bit as shown in FIG. 2 if available, or other identification information. A general listing method may be (1, sb1kG, 0) as shown in FIG. 11B, where '1', being an identification information, denotes no replacement block is assigned to a defective block.

In the meantime, if it is determined in the step 204 that the present data write/read is a non-realtime write/read, a replacement block is taken for conducting the write/read (step 207). If the defective block is one listed on the SDL, the data write/read is conducted on the replacement block of the defective block, but if the defective block is one newly found, a replacement is taken from the spare area for conducting the data write/read. And, the new defective block is listed on the SDL (step 208), when information on the defective block and on a replacement block of the defective block, and information indicating that a linear replacement is made and the replacement block has no defect, are listed on the SDL entry. Upon completion of the data write/read (step 210), a command execution report is provided to the host (step 211). As the host knows according to the protocol that the optical disk recording/reproducing device skips the defective block listed on the SDL, the host is not required to update the command execution report upon reception of one if a file system is provided using the protocol. That is, though the information on the defective block newly listed on the SDL may be transferred to the host, as the data write/read is continued on the defective block as it is without taking the new defective block as a defective block, the host is not required to update information like the file system.

And, when a data is read after completion of writing according to the aforementioned process, a data read is started from the defective block (sb1kG). And, a rewriting is to be made on the same position, the block may be skipped or linearly replaced depending on the data write/read being a realtime one or not as the defective block is listed on the SDL already. There is a probability that the data may not be read regularly as the sb1kG is a defective block in reading. However, since the realtime writing/reading is done for an A/V data, slight loss of the data matters not so much because the loss is negligible to a human vision.

Thus, the second recording/reproducing method of an optical recording medium of the present invention can reduce a data loss as much as the skipping of defective block listed on the SDL already. And, because the host knows information on a defective block listed on the SDL in advance, and the data write/read is continued on a new defective block as it is without skipping the new defective block, the transfer of error information to the host whenever a defective block is encountered is not required, which reduces interface between the host and the optical disk recording/reproducing device as well as a burden on the host. The information on the defective block not listed on the SDL is transferred to the host during a time period that does not interfere with the write/read.

The first embodiment recording/reproducing method of an optical recording medium of the present invention is more preferable when a host gives a write/read command without taking a defective block listed on a DMA, particularly to an SDL and the like, into account. And, the second embodiment recording/reproducing method of an optical recording medium of the present invention is more preferable when the host gives a write/read command taking that the optical disk recording/reproducing device will skip the defective block listed on the SDL into account according to a protocol between the host and the optical disk recording/reproducing device. Especially, the first embodiment recording/reproducing method of an optical recording medium of the present invention is preferable in view of speed and simplification, and the second embodiment recording/reproducing method of an optical recording medium of the present invention is preferable in view of data protection.

The recording/reproducing method of an optical recording medium of the present invention can simplify interface between the host and the optical disk recording/reproducing device in writing/reading, which reduces a burden on the host, by writing/reading a data on a defective block as it is, disregarding the defect when the defective block is encountered during a realtime writing/reading, or by writing/reading a data while skipping a defective block listed on the SDL and not skipping a new defective block not listed on the SDL, but listing the positional information of the new defective block on an SDL entry. The data recording/reading method of the present invention can simplify a hardware while reducing a time loss which is an important factor in a realtime writing/reading, because the data write/read is conducted as it is even for a defective block, dispensing with requirements of ECC encoding and modulation when the defective block is encountered.

It will be apparent to those skilled in the art that various modifications and variations can be made in the recording/reproducing method of an optical recording medium of the present invention without departing from the spirit or scope of the invention. Thus, it is intended that the present invention cover the modifications and variations of this invention provided they come within the scope of the appended claims and their equivalents.

What is claimed is:

1. A method for recording or reproducing a data to or from a recording medium, comprising the steps of:
   (1) conducting data writing or reading to or from a defective block if the defective block is encountered during a realtime writing or reading; and,
   (2) conducting data writing or reading to or from a replacement block associated with the defective block if the defective block is encountered during a non-realtime writing or reading.

2. A method as claimed in claim 1, further comprising the step of storing positional information of the defective block if the defective block is a new defective block.

3. A method as claimed in claim 2, wherein the positional information of the defective block is stored in an SDL (secondary defect list).

4. A method as claimed in claim 3, wherein, if the defective block is encountered during the realtime writing/reading, only the positional information of the defective block is stored in the SDL.

5. A method of claim 4, wherein the positional information includes information indicating that no block replacement operation has been performed in association with the defective block.

6. A method as claimed in claim 3, wherein, if the defective block is encountered during the non-realtime writing/reading, positional information both of the defective block and the replacement block is stored in the SDL.

7. A method of claim 6, wherein the positional information includes information indicating that a block replacement operation has been performed in association with the defective block.

8. A method for recording or reproducing a data to or from a recording medium in realtime, comprising the steps of:
   (1) conducting a data writing or reading to or from a defective block as it is if the defective block is encountered during data writing or reading; and,
   (2) storing positional information of the defective block if the defective block is a new defective block.

9. A method as claimed in claim 8, wherein the defective block in the conducting step is either a defective block stored in a predetermined defect list or a new defective block not stored in the predetermined defect list.

10. A method of claim 9, wherein the predetermined defect list is an SDL (secondary defect list).

11. A method as claimed in claim 8, wherein the positional information of the defective block is stored in an SDL (secondary defect list).

12. A method as claimed in claim 8, wherein only the positional information of the defective block is stored in an SDL (secondary defect list), including information that no replacement operation has been performed in association with the defective block.

13. A method for recording or reproducing a data to or from a recording medium, comprising the steps of:
  (1) determining whether a defective block is one listed on a list if the defective block is encountered during data writing or reading;
  (2) continuing the data writing or reading on the defective block if it is determined in the step (1) that the defective block is one not listed on the list; and,
  (3) storing positional information of the defective block on the list.

14. A method as claimed in claim 13, wherein only the positional information of the defective block is stored in the list, including information that no block replacement operation has been performed in association with the defective block.

15. A method as claimed in claim 13, wherein a data reading is started from the defective block in reading the data after completion of writing by repeating the above steps.

16. A method as claimed in claim 13, wherein data is written on a non-defective block next to the defective block without writing the data on the defective block in data rewriting, after completion of writing by repeating the above steps.

17. A method as claimed in claim 13, wherein, if it is determined in the above step (1) that the defective block is listed on the list, the defective block is skipped and the data writing/reading is conducted on a non-defective block next to the defective block.

18. A method of claim 13, wherein the list is an SDL (secondary defect list).

19. A method of claim 13, further comprising:
  (4) determining whether a data writing or reading is a realtime data writing or reading; and
  (5) proceeding to the step (1) if the step (4) determines that the data writing or reading is a realtime data writing or reading.

20. A method of claim 19, further comprising:
  (6) performing a block replacement operation in association with the defective block if the step (4) determines that the data writing or reading is a non-realtime data writing or reading.

* * * * *